(12) United States Patent
Niida et al.

(10) Patent No.: US 6,996,096 B2
(45) Date of Patent: Feb. 7, 2006

(54) COMMUNICATION APPARATUS AND A METHOD OF CONTROLLING A COMMUNICATION APPARATUS

(75) Inventors: Mitsuo Niida, Yokohama (JP); Shinichi Hatae, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/022,979

(22) Filed: Feb. 12, 1998

(65) Prior Publication Data
US 2003/0063601 A1 Apr. 3, 2003

(30) Foreign Application Priority Data

| Feb. 14, 1997 | (JP) | ................................ 9-030281 |
| Feb. 14, 1997 | (JP) | ................................ 9-030286 |
| Feb. 10, 1998 | (JP) | ................................ 10-028416 |
| Feb. 10, 1998 | (JP) | ................................ 10-028417 |

(51) Int. Cl.
*H04L 12/50* (2006.01)

(52) U.S. Cl. .................. 370/360; 370/480; 345/161

(58) Field of Classification Search ................ 370/360, 370/264, 351, 477, 480, 535, 218, 389, 465, 370/369, 359, 321, 358; 345/161–165, 435, 345/155–157; 348/15, 17, 387, 390; 455/66, 455/62, 557, 405; 379/201, 207; 715/531; 710/18, 19; 713/100; 358/442, 1.6; 463/16
See application file for complete search history.

(56) References Cited

U.S. PATENT DOCUMENTS

| 4,236,209 A | * | 11/1980 | Lombardo, Jr. et al. .... 709/249 |
| 4,710,917 A | * | 12/1987 | Tompkins et al. .......... 709/204 |
| 5,298,895 A | * | 3/1994 | Van Maren .................. 341/51 |
| 5,546,382 A | * | 8/1996 | Fujino ........................ 455/405 |
| 5,561,750 A | * | 10/1996 | Lentz .......................... 345/422 |
| 5,717,496 A | * | 2/1998 | Satoh et al. ................ 358/402 |
| 5,734,373 A | * | 3/1998 | Rosenberg et al. ......... 345/161 |

(Continued)

FOREIGN PATENT DOCUMENTS

JP 06-195280 7/1994

(Continued)

OTHER PUBLICATIONS

Issei Kino, "Queueing Networks with Hierarchical Configuration and Active and Passive Stations", 1996, IEEE International COnference, vol. 4, 3051-3056.*

*Primary Examiner*—Chi Pham
*Assistant Examiner*—Prenell Jones
(74) *Attorney, Agent, or Firm*—Fitzpatrick, Cella, Harper & Scinto

(57) ABSTRACT

Communication apparatus having first communication device conformed to a first communication standard and second communication device conformed to a second communication standard different from the first communication standard. A control unit is coupled to the first and second communication device. The first communication device is capable of detecting whether or not another apparatus is disconnected from the first communication device. The control unit is capable of setting the second communication device in an active state if the first communication device detects that another apparatus is disconnected from the first communication device when the second communication device is in an inactive state. The second communication device is capable of being used to communicate with another apparatus when the second communication device is set in an active state, and is not capable of being used to communicate with another apparatus when the second communication device is set in an inactive state.

18 Claims, 11 Drawing Sheets

U.S. PATENT DOCUMENTS

| | | | | |
|---|---|---|---|---|
| 5,739,921 | A * | 4/1998 | Kitajima | 358/442 |
| 5,764,278 | A * | 6/1998 | Nagao | 348/14.1 |
| 5,806,007 | A * | 9/1998 | Raith et al. | 455/574 |
| 5,841,471 | A * | 11/1998 | Endsley et al. | 348/231 |
| 5,969,750 | A * | 10/1999 | Hsieh et al. | 348/387 |
| 5,999,561 | A * | 12/1999 | Naden et al. | 375/206 |
| 6,049,823 | A * | 4/2000 | Hwang | 709/218 |
| 6,054,990 | A * | 4/2000 | Tran | 345/358 |
| 6,064,398 | A * | 5/2000 | Ellenby et al. | 345/435 |
| 6,064,491 | A * | 5/2000 | Matsumoto | 358/1.15 |
| 6,088,045 | A * | 7/2000 | Lumelsky et al. | 345/509 |
| 6,091,728 | A * | 7/2000 | Lazraq et al. | 370/395 |
| 6,115,137 | A * | 9/2000 | Ozawa et al. | 358/1.6 |
| 6,130,758 | A * | 10/2000 | Funazaki | 710/3 |
| 6,138,178 | A * | 10/2000 | Watanabe | 710/8 |
| 6,167,061 | A * | 12/2000 | Nakatsugawa | 370/480 |
| 6,195,068 | B1 * | 2/2001 | Suzuki et al. | 345/2.2 |
| 6,208,266 | B1 * | 3/2001 | Lyons et al. | 340/870.02 |
| 6,249,241 | B1 * | 6/2001 | Jordan et al. | 342/41 |
| 6,251,014 | B1 * | 6/2001 | Stockdale et al. | 463/16 |
| 6,252,583 | B1 * | 6/2001 | Braun et al. | 345/156 |
| 6,477,589 | B1 * | 11/2002 | Suzuki et al. | 710/18 |
| 6,715,071 | B2 * | 3/2004 | Ono et al. | 713/100 |
| 6,745,256 | B2 * | 6/2004 | Suzuki et al. | 710/18 |

FOREIGN PATENT DOCUMENTS

JP      09-011585      1/1997

* cited by examiner

TRANSMITTED
FIRST

TRANSMITTED
FIRST

TRANSMITTED
FIRST

COMMUNICATION APPARATUS AND A METHOD OF CONTROLLING A COMMUNICATION APPARATUS

BACKGROUND OF THE INVENTION

1. Field of the Invention

The present invention relates to a communication apparatus adapted to use two or more different communication standards, in an electronic device capable of transmitting and receiving information data via a digital interface.

2. Related Background Art

Recently, apparatuses and systems for processing not only text information such as documents but also various information such as images and sounds are beginning to be extensively used with the improvement of the processing capability of a central processing unit (CPU) using a computer or the like, the progress of a graphical operating system (OS) for operating hardware, the increase in capacity and the progress of digitization of communication information in a network, and the development of information compression techniques.

With the development of such multimedia technologies, it is becoming possible to transmit all types of data in all forms by all communication protocols via a single digital interface (digital I/F). It is also becoming possible for an apparatus corresponding to one communication protocol and incorporating a plurality of units to externally control each unit and exchange information with external devices.

As an example of the digital I/F bus systems described above, a communication system has been proposed in which AV devices, such as a digital video tape recorder (to be referred to as a VTR hereinafter), a digital television receiver, and a tuner, and a personal computer (to be referred to as a PC hereinafter) are mutually connected by an IEEE1394 serial bus (to be referred to as 1394 hereinafter), and digital video signals and digital audio signals are transmitted and received between these electronic devices. An outline of this 1394 system will be described below.

As shown in FIG. 1, the 1394 system includes, as digital devices, a PC and a VTR corresponding to VGA (Video Graphics Array) inputs from a digital I/F, and a digital camera (to be referred to as a DCAM hereinafter) and a digital cam coder (to be referred to as DVCR) corresponding to VGA outputs from a digital I/F. The DVCR and the PC, the PC and the VTR, and the VTR and the DCAM are connected by the 1394 serial bus described above.

Each digital device described above has a function of relaying digital data and control data on the 1394 serial bus. Also, a cable for the 1394 serial bus includes three shielded twisted pair lines. Each twisted pair line is used to transfer protocol signals and data and supply electric power. Therefore, the whole system can operate even when a certain device is turned off in the system.

The basic configuration of each digital device has an operation unit as a user interface, a display unit, a CPU for controlling the operation of the whole device, forming packets for communication, and holding addresses, a digital I/F for the 1394 serial bus, and a switch unit for performing switching between a deck unit, a tuner unit, or a camera unit (neither is shown) and the digital I/F.

In this 1394 system, as shown in FIG. 2, communication is performed at a predetermined communication cycle (125 $\mu$s). Data having a time axis such as video data or audio data is transmitted by isochronous (synchronous) communication by which a transfer band is guaranteed at a fixed data rate. Control data such as a control command is transmitted irregularly, where necessary, by asynchronous communication.

In communication like this, a cycle start packet exists at the beginning of each communication cycle, and a period for transmitting a packet for isochronous communication is set subsequently to the cycle start packet. A plurality of channels of isochronous communication can be simultaneously performed by assigning channel numbers to packets for isochronous communication.

For example, when channel 1 is assigned to communication from the DVCR to the VTR, the DVCR transmits an isochronous communication packet of channel number 1 onto the bus immediately after the cycle start packet. Meanwhile, the VTR monitors packets on the bus and receives the packet assigned with channel number 1. In this manner isochronous communication is executed between the DVCR and the VTR.

Analogously, when channel number 2 is assigned to a packet from the DCAM to the PC, isochronous communication is executed between the DCAM and the PC by transmitting the packet of channel number 2 onto the bus after the packet of channel number 1, and the isochronous communications between channel 1 and channel 2 are performed parallel. A period from the completion of transmission of all isochronous communication packets in each communication cycle to the next cycle start packet is used in asynchronous communication.

Bus management by which the 1394 serial bus system described above can operate will be described below.

An apparatus serving as a bus manager previously checks the network structure and the connection states of all nodes and controls bus communication by defining each node ID and controlling isochronous communication.

That is, in the communication system as described above, when the power supply is turned on or when a new digital device is connected or a certain device is disconnected, node IDs (physical addresses #0, #1, #2, and #3 in FIG. 3) are automatically assigned to the individual devices (nodes) in accordance with their connection states by the following procedure based on an address program and an address table stored in an internal memory of the CPU, thereby automatically setting topology.

This node ID assignment procedure will be briefly described below. This procedure includes determination of the hierarchical structure of the system and assignment of physical addresses to the nodes.

Assume that the above digital devices, i.e., the PC, DVCR, VTR, and DCAM are nodes A, B, C, and D, respectively.

First, each node transmits to a partner node, to which this node is connected by the 1394 serial bus, information indicating that the partner is its parent. While giving priority to a node first transmitting this information to its partner, the parent-child relationship between the nodes in this system, i.e., the hierarchical structure of the system and a route node which is not a child of any other node are finally determined.

More specifically, the node D informs the node C that the partner is a parent, and the node B informs the node A that the partner is a parent. If the node A informs the node C that the partner is a parent and the node C informs the node A that the partner is a parent, a node which first transmits the information to its partner is given priority. That is, if the transmission from the node C is earlier, the node A is regarded as a parent of the node C. As a consequence, the node A is not a child of any other node. If this is the case, the node A is a route node.

After the parent-child relationship between the digital devices is thus determined, assignment of physical addresses is performed. This physical address assignment is basically done in such a manner that parent nodes permit child nodes to perform address assignment and these child nodes permit themselves to perform address assignment from one connected to the smaller port number.

When the parent-child relationship is determined as above in the example shown in FIG. 3, the node A first permits the node B to perform address assignment. As a consequence, the node B assigns physical address #0 to itself. The node B sends this information onto the bus to inform the other nodes that "physical address #0 is already assigned".

Next, the node A permits the node C to perform address assignment, and the node C similarly permits the node D, i.e., the child of the node C, to perform address assignment. Consequently, the node D assigns physical address #1, next to physical address #0, to itself, and sends this information onto the bus.

Thereafter, the node C assigns physical address #2 to itself and sends this information onto the bus. Finally, the node A assigns physical address #3 to itself and sends this information onto the bus.

A data transfer procedure will be described next.

Data transfer is enabled by assigning physical addresses as described above. In the 1394 serial bus system, however, arbitration of the bus use rights is performed by the route node prior to data transfer. That is, in the 1394 as shown in FIG. 4, only data of one channel is transferred at a certain timing. Therefore, the bus use rights must be arbitrated first.

When each node wants to perform data transfer, the node requests its parent node to issue the bus use right. As a consequence, the route node arbitrates the requests for the bus use rights from these nodes. A node which acquires the bus use right as a result of the arbitration designates the transmission rate before beginning data transfer. That is, the node informs the transmission destination node that the transmission rate is 100, 200, or 400 Mbps.

Thereafter, in the case of isochronous communication, the transmission source node starts data transfer by the designated channel immediately after receiving a cycle start packet transmitted by the route node as a cycle master in synchronism with the communication cycle. Note that the cycle master transmits the cycle start packet onto the bus and also matches the time of the individual nodes.

In the case of asynchronous communication in which control data such as a command is transferred, on the other hand, after synchronous transfer in each communication cycle is complete, arbitration for asynchronous communication is performed, and data transfer from the transmission source node and the transmission destination node is started.

In addition to the IEEE1394 standard described above, the RS-232C standard and the RS-422 standard presently exist and are used as the conventional serial data communication methods. These standards assume mutual connection using serial binary data exchange between a data terminal equipment (DTE) and a data circuit-terminating equipment (DCE). These standards are formed and open to the public by the American National Standards Institute (ANSI).

As another example of the digital I/F bus systems, a universal serial bus (to be referred to as a USB hereinafter) as defined in Universal Serial Bus Specification (Revision 1.0, Jan. 15, 1996) is proposed. This bus is invented as an external bus for connecting a PC and its peripheral devices. An outline of this USB system will be described below.

The connection form of the USB will be described with reference to FIG. 3. This USB system comprises a host computer 300 such as a PC, a route hub 302, a first device 304 which is a recording medium such as a hard disk, a composite device 306 such as a camera-integrated VTR, a first hub 308, a second device 310 such as a video camera, a third device 312 such as a VTR, a second hub 314, a fourth device 316 which is an input device such as a keyboard, and a fifth device 318 which is a pointing device such as a mouse. A hub has a function of adding a USB device. Also, a device is a terminal equipment including a USB bus interface (not shown). In this USB as shown in FIG. 3, the terminal equipments are connected via the hubs including the route hub 302 on the host computer 300, thereby forming a multiple star connection.

Since the host computer 300 has rights to access the first, second, third, and fourth devices 304, 310, 312, and 316, data exchange between these devices is performed via the host computer 300. Therefore, bus arbitration between the devices is not performed.

In the USB, data transfer is performed by a frame whose unit is 1±0.05 ms. FIG. 4 shows the structure of the frame in the USB. Packets are packed in this frame in accordance with the purpose and transferred. Four types of packets are defined in the USB. The first one is a token packet, the second one is a start-of-frame packet (to be referred to as an SOF packet hereinafter), the third one is a data packet, and the fourth one is a handshake packet. The frame is started by the SOF packet.

The host computer 300 performs data transfer with a plurality of devices by sequentially sending data transfer requests previously scheduled in the frame. If data is large-amount data, such as image data, which cannot be contained in a single frame, the host computer 300 divides the data in units of frames and transfers the divided data.

Packet fields are packed in the above four types of packets in accordance with the purpose and transferred. In the USB, six types of packet fields are defined. The first one is an 8-bit packet identifier field (to be referred to as a PID hereinafter), the second one is a 7-bit address field (to be referred to as an ADDR hereinafter), the third one is a 4-bit endpoint field (to be referred to as an ENDP hereinafter), the fourth one is an 11-bit frame number field, the fifth one is a 1- to 1023-byte data field, and the sixth one is a 5- or 16-bit cyclic redundancy checks field (the 5- and 16-bit ones will be referred to as a CRC5 and a CRC16, respectively, hereinafter). The four types of packets described above are constituted by combining these packet fields.

FIGS. 5A to 5D show the arrangements of the four types of packets. As shown in FIG. 5A, the token packet is constituted by the combination of the PID, ADDR, ENDP, and CRC5 fields. As shown in FIG. 5B, the SOF packet is constituted by the combination of the PID, frame number, and CRC5 fields. As shown in FIG. 5C, the data packet is constituted by the combination of the PID, data, and CRC16 fields. As described above, the data field has 1- to 1023-byte data. Also, as shown in FIG. 5D, the handshake packet is constituted only by the PID.

In the USB, two transfer modes are defined. One is a full-speed transfer mode whose average bit rate is 12 Mbps. The other is a low-speed transfer mode whose average bit rate is 1.5 Mbps.

Also, four data transfer methods are defined in the USB. The first one is isochronous transfer. In isochronous transfer, a transfer width which is a data amount of transfer performed for each frame and a transfer time from transfer request to transfer start are guaranteed. Also, in isochronous transfer, no retransmission request can be made even if an error occurs in transfer data. The second one is interrupt transfer. In interrupt transfer, only inputs from the individual devices to the host computer 300 are possible. Also, in interrupt transfer, the data transfer priority order on the bus is comparatively high. The third one is bulk transfer. In bulk transfer, the data transfer priority order is the lowest of the four transfer methods. The fourth one is control transfer. Control transfer is performed to exchange setup data for setting up the individual devices.

The 1394 serial bus system and the USB described above are communication systems which have not been put into practical use until recently, and the conventional communication systems using RS-232C and RS-422 are still extensively used presently.

The present situation, therefore, is that all of digital devices corresponding to the 1394, digital devices corresponding to the USB, and digital devices corresponding to RS-232C and RS-422 coexist.

Accordingly, it is expected that apparatuses including the interfaces of both the 1394 and the USB which are main streams in recent years will be extensively demanded. It is also expected that apparatuses including both the 1394 interface and the interface of RS-232C or RS-422 will be extensively demanded. Furthermore, it is expected that apparatuses including a plurality of interfaces of, e.g., the 1394, the USB, and RS-232C will be extensively demanded.

If, however, two or more types of communication devices are incorporated into a single apparatus to perform communication by two or more communication systems, the circuit scale is increased, and this significantly increases the cost.

SUMMARY OF THE INVENTION

The present invention has been made in consideration of the above situation, and has as its first object to provide a communication apparatus, and a of controlling a communication apparatus, capable of selecting two or more communication systems by using a single device without increasing the cost due to an increase in the circuit scale or deteriorating the operability in setting device connection.

According to a preferred embodiment of the present invention, there is provided a communication apparatus having first communication means conformed to a first communication standard, second communication means conformed to a second communication standard different from the first communication standard, and a control unit coupled to the first and second communication means. The first communication means is capable of detecting whether or not another apparatus is disconnected from the first communication means. The control unit is capable of setting the second communication means in an active state, if the first communication means detects that another apparatus is disconnected from the first communication means when the second communication means is in an inactive state. Further, the second communication means is capable of being used to communicate with another apparatus when the second communication means is set in the active state, and is not capable of being used to communicate with another apparatus when the second communication means is set in the inactive state.

According to another preferred embodiment of the present invention, there is provided a method of controlling a communication apparatus that includes first communication means conformed to a first communication standard, and second communication means conformed to a second communication standard different from the first communication standard. The method includes a step of detecting, using the first communication means, whether or not another apparatus is disconnected from the first communication means. The method also includes a step off setting the second communication means in an active state, if the first communication means detects that another apparatus is disconnected from the first communication means when the second communication means is in an inactive state. In addition, the second communication means is capable of being used to communicate with another apparatus when the second communication means is set in the active state, and is not capable of being used to communicate with another apparatus when the second communication means is set in the inactive state.

Other objects, features and advantages of the invention will become apparent from the following detailed description taken in conjunction with the accompanying drawings.

BRIEF DESCRIPTION OF THE DRAWINGS

FIGS. 5A, 5B, 5C and 5D are views showing packets used in data transfer of the USB;

DETAILED DESCRIPTION OF THE PREFERRED EMBODIMENTS

Figure 1:
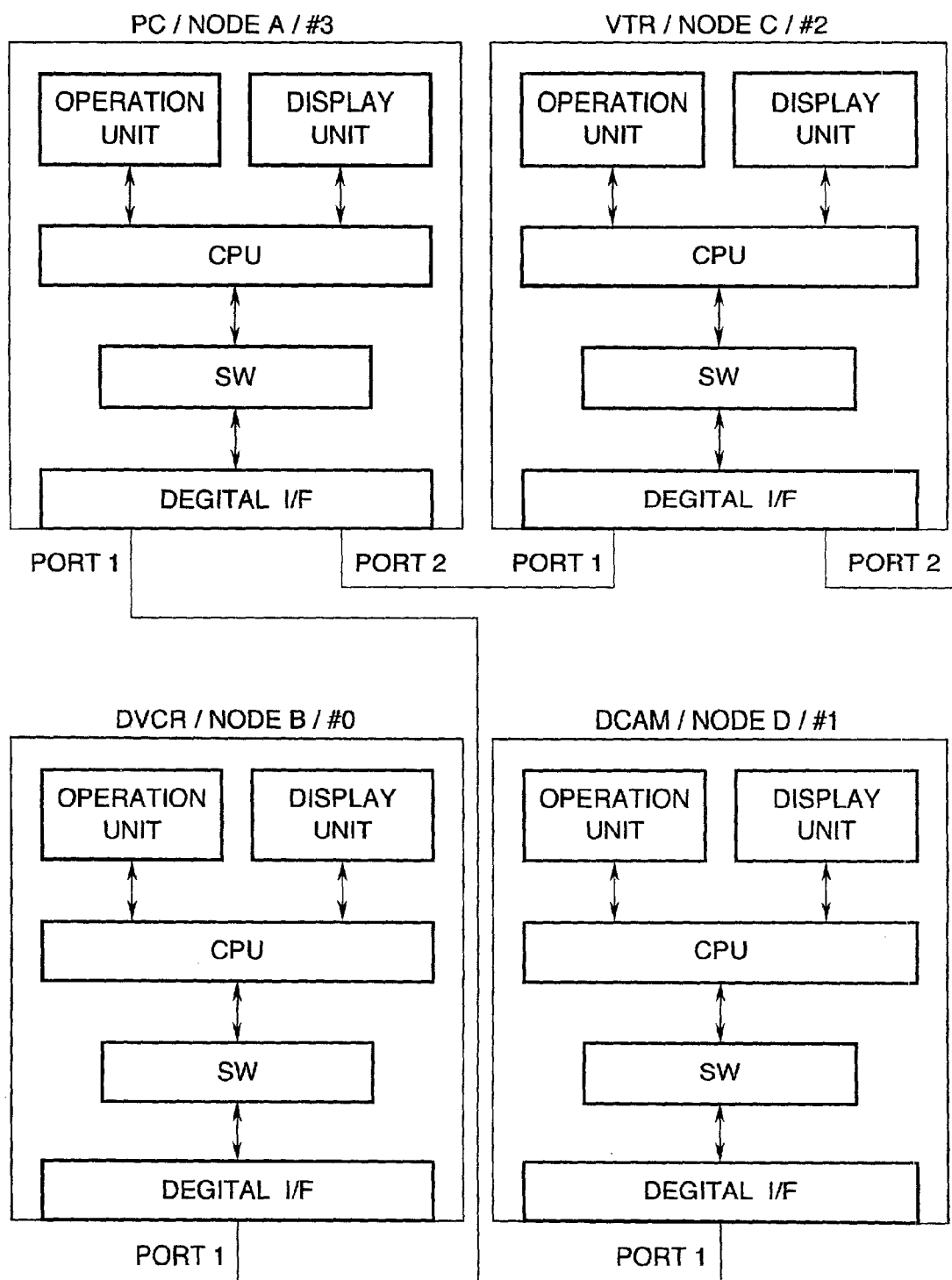
FIG. 1 is a view showing the connection form of an IEEE1394 serial bus.
Figure 2:
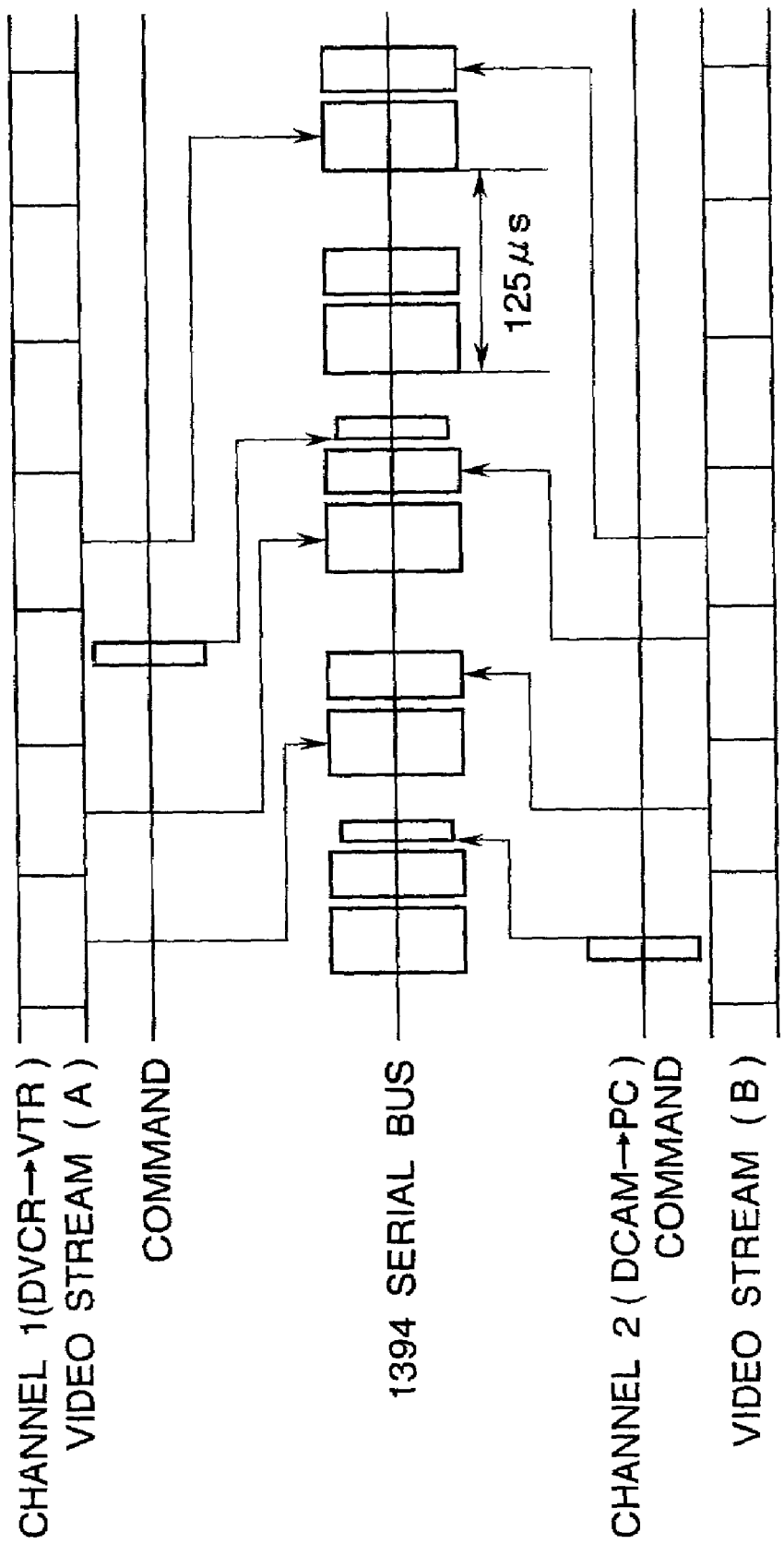
FIG. 2 is a timing chart showing a communication example using the IEEE1394 serial bus.
Figure 3:
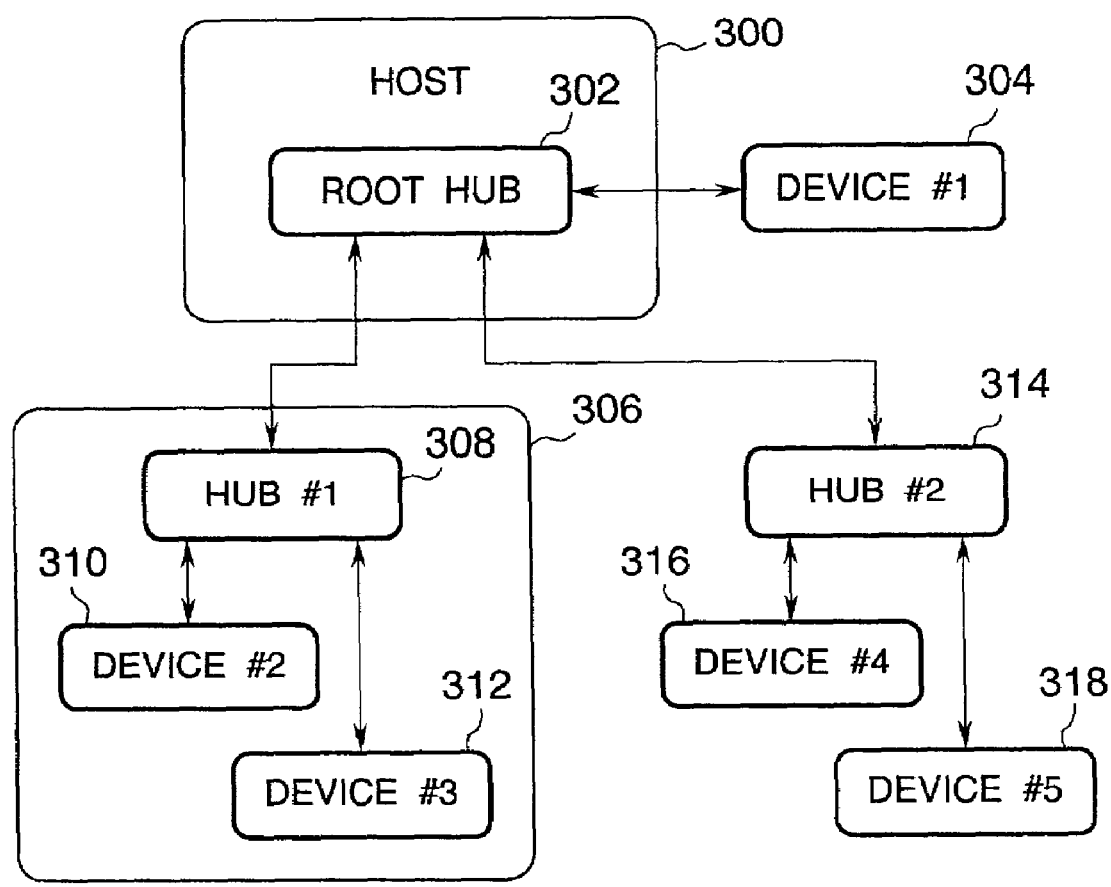
FIG. 3 is a view showing the connection form of a USB.
Figure 4:
FIG. 4 is a view showing a data transfer unit of the USB.
Figure 5A:
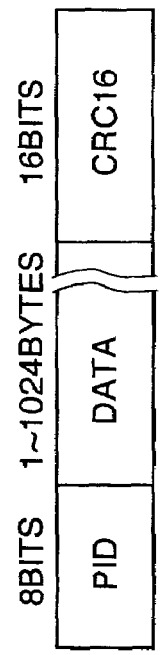
Figure 5C:
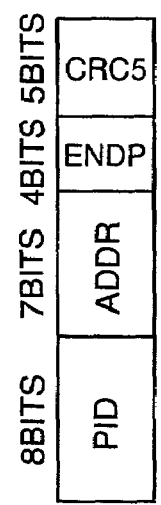
Figure 5D:
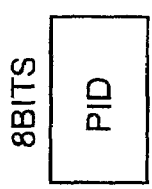
Figure 6:
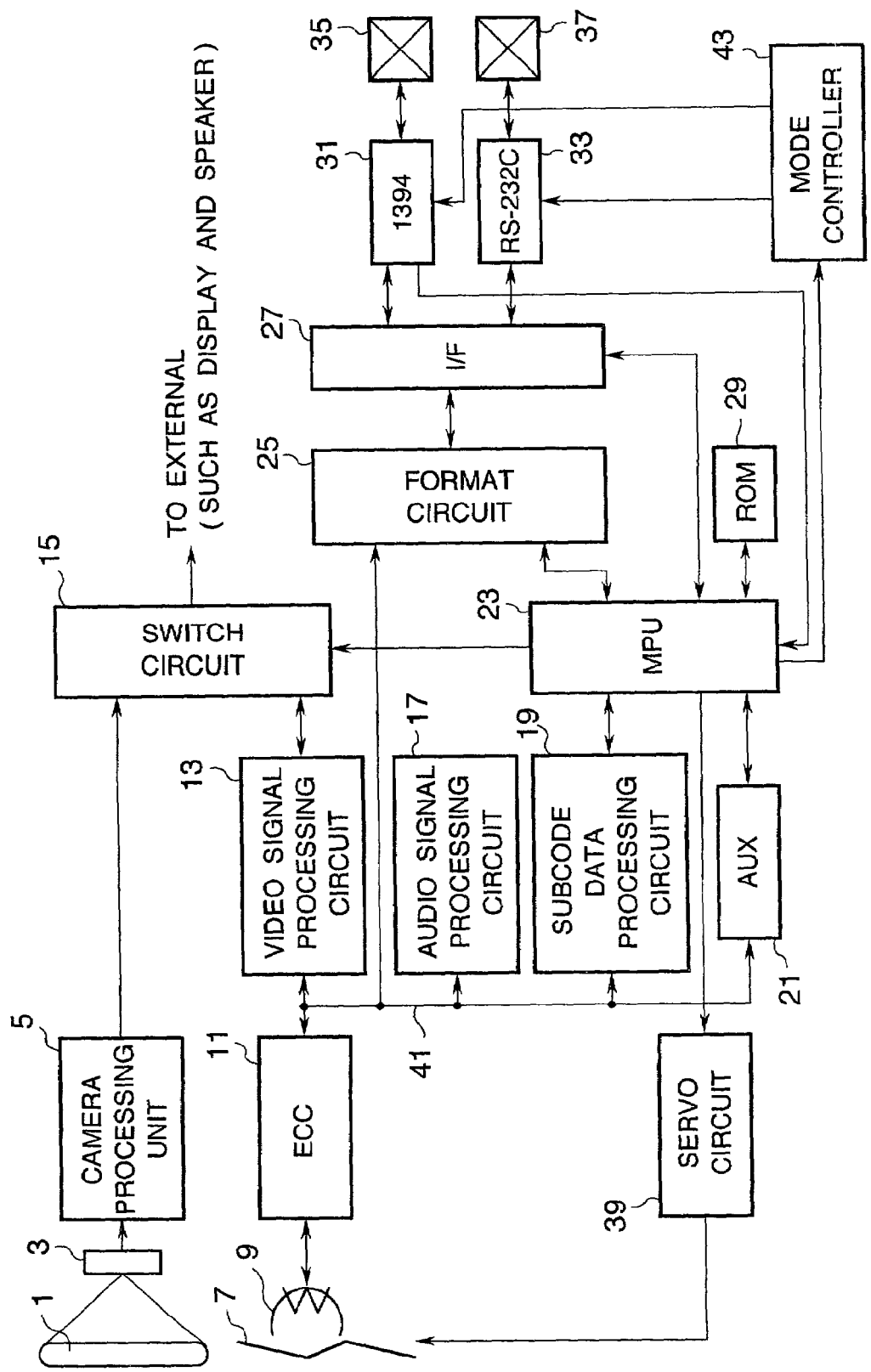
FIG. 6 is a block diagram showing the arrangement of a digital video camera of the first embodiment according to the present invention.

The first embodiment of the present invention will be described below with reference to the accompanying drawings. FIG. 6 is a block diagram showing the embodiment in which the present invention is applied to a video camera, i.e., a so-called SD (Standard Definition) video camera, for recording and reproducing an SD video signal.

Referring to FIG. 6, this SD video camera comprises a lens 1, an image sensing device 3 such as a CCD, a camera processing unit 5, a recording medium 7 such as a magnetic tape, a helical scan head (to be referred to as a head hereinafter) 9, an error correction circuit (to be referred to as an ECC hereinafter) 11, a video signal processing circuit 13, a switch circuit 15, an audio signal processing circuit 17, and a subcode data processing circuit 19.

The SD video camera further comprises an auxiliary data processing circuit (to be referred to as an AUX data processing circuit hereinafter) 21, an arithmetic processing unit (to be referred to as an MPU hereinafter) 23, a format circuit 25, an interface circuit (to be referred to as an I/F circuit hereinafter) 27, a read-only memory (to be referred to as a ROM hereinafter) 29, a 1394 driver 31, an RS-232C driver 33, a 1394 I/O port 35, an RS-232C I/O port 37, a servo circuit 39, a data bus 41, and a mode controller 43.

An object image taken through the lens 1 is photoelectrically converted by the CCD 3 and subjected to predetermined signal processing by the camera processing unit 5. Consequently, a luminance signal Y and color difference signals V and U are generated at a ratio of 4:1:1 as digital video signals. These digital video signals thus generated are input to the switch circuit 15.

In performing encoding, the digital video signals are applied from the switch circuit 15 to the video signal processing circuit 13 under the switching control by the MPU 23. The video signal processing circuit 13 performs compression coding for the 4:1:1 digital video signals by block formation, discrete cosine transform (to be referred to as DCT hereinafter), quantization, and fixed-length coding.

Also, in performing encoding, a digital audio signal is input from a circuit (not shown) such as a microphone or an audio amplifier to the audio signal processing circuit 17 via the switch circuit 15 and encoded by the audio signal processing circuit 17. Additionally, subcode data and AUX data are input from the MPU 23 to the subcode data processing circuit 19 and the AUX data processing circuit 21, respectively, and processed by these circuits.

The video signal, audio signal, subcode data, and AUX data processed by the video signal processing circuit 13, the audio signal processing circuit 17, the subcode data processing circuit 19, and the AUX data processing circuit 21, respectively, are input to the ECC 11 through the data bus 41. The ECC 11 adds an error correcting code to these signals. The signals are then transmitted through a modulation circuit and a head amplifier (neither is shown) and written on the magnetic tape 7 with the head 9.

In performing decoding, on the other hand, the head 9 reproduces digital signals from a track on the magnetic tape 7. The ECC 11 performs error correction for the reproduced digital signals. Of the digital signals output as digital block data from the ECC 11 to the data bus 41, the video signal processing circuit 13 connected to the data bus 41 decodes a video signal to generate a luminance signal Y and color difference signals U and V at a ratio of 4:1:1. These generated signals are output outside via the switch circuit 15.

Of the digital signals output as digital block data from the ECC 11, an audio signal is input, similar to the video signal, to the audio signal processing circuit 17 through the data bus 41. The audio signal is decoded by the audio signal processing circuit 17 and output outside via the switch circuit 15. Meanwhile, the subcode data processing circuit 19 and the AUX data processing circuit 21 connected to the data bus 41 input decoded subcode data and AUX data, respectively, to the MPU 23.

The compression-coded video and audio data are input to the format circuit 25 through the data bus 41. While the video signal processing circuit 13 and the audio signal processing circuit 17 are performing encoding, the input video and audio data to the format circuit 25 are data before the error correcting code is added by the ECC 11. On the other hand, while the video signal processing circuit 13 and the audio signal processing circuit 17 are performing decoding, the input video and audio data to the format circuit 25 are data after the error correcting code is removed by the ECC 11.

The output subcode data and AUX data from the MPU 23 are also input to the format circuit 25. The format circuit 25 reconstructs these video data, audio data, subcode data, and AUX data into DIF data (digital interface data) and outputs these DIF data to the I/F circuit 27. These DIF data are packeted by the I/F circuit 27.

Note that the format circuit 25 and the I/F circuit 27 are so controlled by the MPU 23 as to perform processing suited to the selected one of the 1394 interface and the RS-232C interface.

When the 1394 interface is to be used, the packet data formed by the I/F circuit 27 is supplied to the 1394 I/O port 35 via the 1394 driver 31. When the RS-232C interface is to be used, the packet data formed by the I/F circuit 27 is supplied to the RS-232C I/O port 37 via the RS-232C driver 33.

The 1394 driver 31 monitors the state of connection to the 1394 serial bus by detecting the power supply voltage of a power supply twisted pair line of 1394 twisted pair lines, and outputs data indicating the connection state (to be referred to as 1394 connection state data hereinafter) to the MPU 23. The power supply voltage level of the power supply twisted pair line is raised when the 1394 serial bus is connected to the 1394 driver 31, and is lowered when the bus is disconnected. Therefore, the connection state can be detected by monitoring this voltage level.

The 1394 interface and the RS-232C interface can also be switched by the user by operating an external select switch (not shown) or automatically switched by, e.g., the MPU 23 by detecting the connections of the interfaces.

Although the automatic switching between the interfaces will be described later, the mode controller 43 switches the communication modes (switches the communication systems IEEE1394 and RS-232C) in accordance with a setting signal (to be described later) sent from the MPU 23.

The servo circuit 39 controls the running of the magnetic tape 7 in accordance with a designation signal from the MPU 23. Note that the MPU 23 performs processing in accordance with input designating information from an operation panel (not shown) and manages the operation mode of the whole system of this digital VTR and its various status transitions.

This servo circuit 39 primarily has a function of stationarily maintaining the driving of a rotary drum and a capstan (neither is shown). That is, the servo circuit 39 is connected to a capstan motor (not shown) for controlling the tape feed speed, a capstan FG (Frequency Generator) for checking the rotating state of the capstan motor, a drum motor for rotating a rotary drum, and detectors FG and PG (Phase Generator) for checking the rotational speed and the rotational phase of the drum motor. These components are controlled by the servo circuit 39.

Figure 7A:
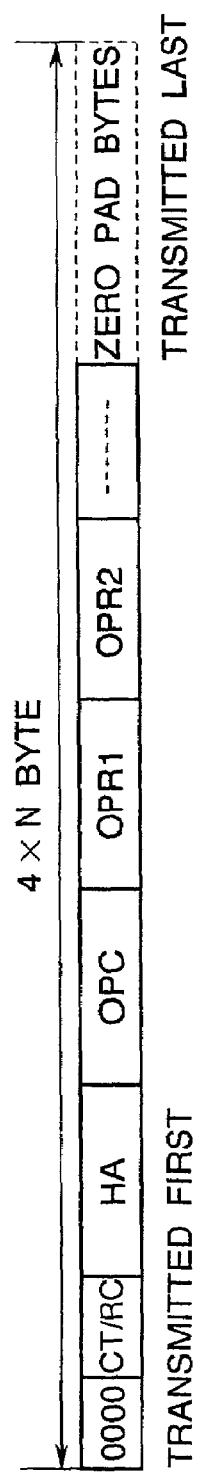
FIGS. 7A and 7B are views showing general formats of command data for the IEEE1394.
Figure 7B:
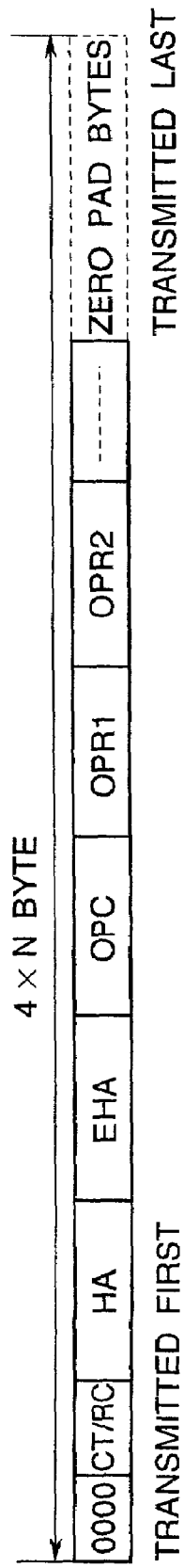

Command data for the SD video camera of this embodiment is externally applied to the 1394 I/O port 35. FIGS. 7A and 7B are views showing general formats of the 1394 command data applied to the 1394 I/O port 35. Referring to FIGS. 7A and 7B, CT and RC are 4-bit codes indicating a command type and a response code, respectively. Table 1 below shows codes of the command type, and Table 2 below shows codes of the response code.

TABLE 1

| CT/RC code (binary) | | | | Command type |
|---|---|---|---|---|
| MSB | | | LSB | |
| 0 | 0 | 0 | 0 | Control command |
| 0 | 0 | 0 | 1 | State inquiry command |
| 0 | 0 | 1 | 0 | Support inquiry command |
| 0 | 0 | 1 | 1 | Report request command |

TABLE 1-continued

| CT/RC code (binary) | | | | |
|---|---|---|---|---|
| MSB | | | LSB | Command type |
| 0 | 1 | 0 | 0 | (Unused) |
| 0 | 1 | 0 | 1 | (Unused) |
| 0 | 1 | 1 | 0 | (Unused) |
| 0 | 1 | 1 | 1 | (Unused) |

TABLE 2

| CT/RC code (binary) | | | | |
|---|---|---|---|---|
| MSB | | | LSB | Response code |
| 1 | 0 | 0 | 0 | Conditions unfulfilled |
| 1 | 0 | 0 | 1 | Admitted |
| 1 | 0 | 1 | 0 | Rejected |
| 1 | 0 | 1 | 1 | Transiting |
| 1 | 1 | 0 | 0 | Conditions fulfilled/standby |
| 1 | 1 | 0 | 1 | Already changed |
| 1 | 1 | 1 | 0 | (Unused) |
| 1 | 1 | 1 | 1 | Busy |

Referring to FIGS. 7A and 7B, HA indicates a header address, and EHA indicates an extended header The header address is an 8-bit code and used as an identification code for a plurality of subdevices in one device connected to a communication interface (communication line). That is, the five upper bits of the header address indicate a subdevice type representing the type of the subdevice, and the three lower bits of the header address indicate a subdevice number representing the number of the subdevice among subdevices of the same type indicated by the five upper bits. The extended header address is a header address reserved for the future. Table 3 below shows examples of the subdevice type.

TABLE 3

| Code (binary) | | | | | |
|---|---|---|---|---|---|
| MSB | | | | LSB | Subdevice type |
| 0 | 0 | 0 | 0 | 0 | Video monitor |
| 0 | 0 | 0 | 0 | 1 | (Unused) |
| 0 | 0 | 0 | 1 | 0 | (Unused) |
| 0 | 0 | 0 | 1 | 1 | (Unused) |
| 0 | 0 | 1 | 0 | 0 | Video cassette recorder (VCR) |
| 0 | 0 | 1 | 0 | 1 | TV tuner |
| 0 | 0 | 1 | 1 | 0 | (Unused) |
| 0 | 0 | 1 | 1 | 1 | Video camera |
| 0 | 1 | 0 | 0 | 0 | (Unused) |
| . | | | | | |
| . | | | | | |
| . | | | | | |
| 1 | 1 | 1 | 1 | 1 | |

Referring to FIGS. 7A and 7B, OPC indicates an operation code, and OPR indicates an operand. The operation code indicates the contents of control with respect to a digital device connected to a communication interface (communication line). The operand indicates data required by the operation code. Table 4 below shows examples of the operation code and operand for reproduction.

TABLE 4

| | OPC | OPR | |
|---|---|---|---|
| Reproduction | 0xC3 | Next frame | 0x30 |
| | | Lowest rate | 0x31 |
| | | Low rate 4 | 0x32 |
| | | Low rate 3 | 0x33 |
| | | Low rate 2 | 0x34 |
| | | Low rate 1 | 0x35 |
| | | Normal rate (x1) | 0x36 |
| | | High rate 1 | 0x37 |
| | | High rate 2 | 0x35 |
| | | High rate 3 | 0x38 |
| | | High rate 4 | 0x39 |
| | | Highest rate | 0x3A |
| | | Preceding frame | 0x3B |

The unit of the data length of a command shown in FIGS. 7A and 7B is four bytes. If the data length does not reach an integer multiple of four bytes, data in which all bits are zero is packed in the end of a bit stream so that the data length is an integral multiple of four bytes as a whole.

When the user intends to cause the video cassette recorder (VCR) to perform normal reproduction in the case where the 1394 command data shown in FIGS. 7A and 7B are represented as shown in Tables 1 to 4, a code of command data such as "0x0021C336" (0x indicates hexadecimal notation) is input from an external device. That is, the first "0x00" indicates four bits fixed to 0 at the beginning of the command data and subsequent four bits (see Table 1) representing that the command data is a control command. The next "0x21" indicates an 8-bit header address and shows that the subdevice type is a VCR (see Table 3) and the subdevice is the second device in the VCR. The next "0xC336" indicates an operation code and an operand obtained from Table 4.

When this code for normal reproduction is input to the 1394 I/O port 35, on the basis of this input code the I/F circuit 27 generates an address in the ROM 29 storing control data for normal reproduction and applies the address to the MPU 23. In accordance with the generated address, the MPU 23 reads out the control data from the ROM 29 and controls the rotary drum and the capstan motor (neither is shown) via the servo circuit 39, thereby holding the reproduction state.

Meanwhile, command data for RS-232C is externally input to the RS-232C I/O port 37. In this embodiment, at least some command data of the 1394 command data and the RS-232C command data are used in the both systems.

For example, command data received by the 1394 driver 31 and the RS-232C driver 33 by their respective communication systems and having the same function are used in the two systems. More specifically, assume that M (=integer of 2 or more) command data are transmitted and received by RS-232C and N (=integer of 2 or more, N≧M) command data including command data having the same functions as the M command data are transmitted and received by the 1394. If this is the case, all of the M command data are used in both the 1394 and RS-232C. Alternatively, some of the M command data are used in the two systems.

With this arrangement, a communication device including the I/F circuit 27, the MPU 23, and the like which perform various control operations by interpreting command data can be shared by the 1394 communication system and the RS-232C communication system. This eliminates the need to provide a plurality of communication devices for various communication systems in one digital device. Accordingly, a digital device corresponding to both the 1394 and RS-232C communication systems can be manufactured without increasing the circuit scale.

In RS-232C, two digital devices are usually connected in a one-to-one correspondence with each other. This makes device identification codes, device numbers, and the like data unnecessary. In this embodiment, therefore, a code such as "0xC336" is input to the RS-232C I/O port 37 to indicate the same normal reproduction. Table 5 below shows examples of the RS-232C reproduction codes corresponding to the 1394 control codes described above.

TABLE 5

| Reproduction code | |
|---|---|
| Next frame | 0xC330 |
| Lowest rate | 0xC331 |
| Low rate 4 | 0xC332 |
| Low rate 3 | 0xC333 |
| Low rate 2 | 0xC334 |
| Low rate 1 | 0xC335 |
| Normal rate (x1) | 0xC336 |
| High rate 1 | 0xC337 |
| High rate 2 | 0xC335 |
| High rate 3 | 0xC338 |
| High rate 4 | 0xC339 |
| Highest rate | 0xC33A |
| Preceding frame | 0xC33B |

When data is transferred by omitting the identification code and the device number of a device as described above, a delay time caused by command transfer can be reduced. This is convenient when RS-232C which is a relatively-low-rate interface is used.

When this code for normal reproduction is input to the RS-232C I/O port 37, on the basis of this input code the I/F circuit 27 generates an address in the ROM 29 storing control data for normal reproduction and inputs the address to the MPU 23. In accordance with the generated address, the MPU 23 reads out the control data from the ROM 29 and controls the rotary drum and the capstan motor (neither is shown) via the servo circuit 39, thereby holding the reproduction state.

In the above embodiment, the command data applied to the 1394 I/O port 35 and the RS-232C I/O port 37 and having the same function are the same in the two communication systems. However, even when these command data are different, an increase in the circuit scale can be prevented by generating common control data in the two communication systems from the ROM 29 on the basis of the command data.

If this is the case, the I/F circuit 27 and the MPU 23 generate the same control data for command data received by the 1394 I/O port 35 and the RS-232C I/O port 37 by their respective communication systems and having the same function. That is, the I/F circuit 27 which generates addresses in the ROM 29 storing control data corresponding to the command data received by the I/O ports 35 and 37 generates the same address in the ROM 29 for the command data received by the two communication systems and having the same function.

The above embodiment is described by using the IEEE1394 standard and the RS-232C standard. However, some other standard (e.g., the RS-422 standard) can also be used. Also, when common command data is used for not only a communication apparatus corresponding to two communication standards but also a communication apparatus corresponding to a larger number of communication standards, the communication apparatus can be manufactured without increasing the circuit scale.

In the above embodiment, the two lower bytes of the control command are the same in the IEEE1394 standard and the RS-232C standard. However, this common part can have another arrangement. Additionally, the code length for control is not limited to the above-mentioned code length (four bytes), so any arbitrary code length can be applied.

In this embodiment as described above, in an apparatus in which a given one of a plurality of different communication systems is selected to transmit and receive command data for controlling devices connected to a communication line, at least some of a plurality of command data of the different communication systems or of a plurality of device control data generated on the basis of the received command data are used in all of these communication systems. Therefore, a common communication apparatus for performing various control operations by interpreting the command data or the control data can be used in the different communication systems. That is, it is unnecessary to provide a plurality of communication apparatuses for the different communication systems in one device. Consequently, it is possible to provide a communication apparatus which can select two or more different communication systems and does not largely increase the cost due to an increase in the circuit scale.

The automatic interface switching will be described below.

As described above, the 1394 driver 31 inputs the 1394 connection state data to the MPU 23 in addition to the control data from the 1394 serial bus. If data indicating that the 1394 serial bus is connected is input, the MPU 23 supplies a 1394 setting signal to the mode controller 43 in order to set the communication mode in the 1394 mode. Upon receiving the 1394 setting signal, the mode controller 43 holds the 1394 driver 31 active and holds the RS-232C driver 33 in sleep.

On the other hand, if the 1394 driver 31 is disconnected from the 1394 serial bus, the power supply voltage of the power supply twisted pair line of the 1394 twisted pair lines drops. The 1394 driver 31 detects this voltage drop and outputs to the MPU 23 data indicating that the 1394 driver 31 is disconnected from the 1394 serial bus. Upon receiving this 1394 connection state data, the MPU 23 supplies an RS-232C setting signal to the mode controller 43 in order to set the communication mode in the RS-232C mode. When this RS-232C setting signal is input, the mode controller 43 sets the 1394 driver 31 in sleep and the RS-232C driver 33 active.

Figure 8:
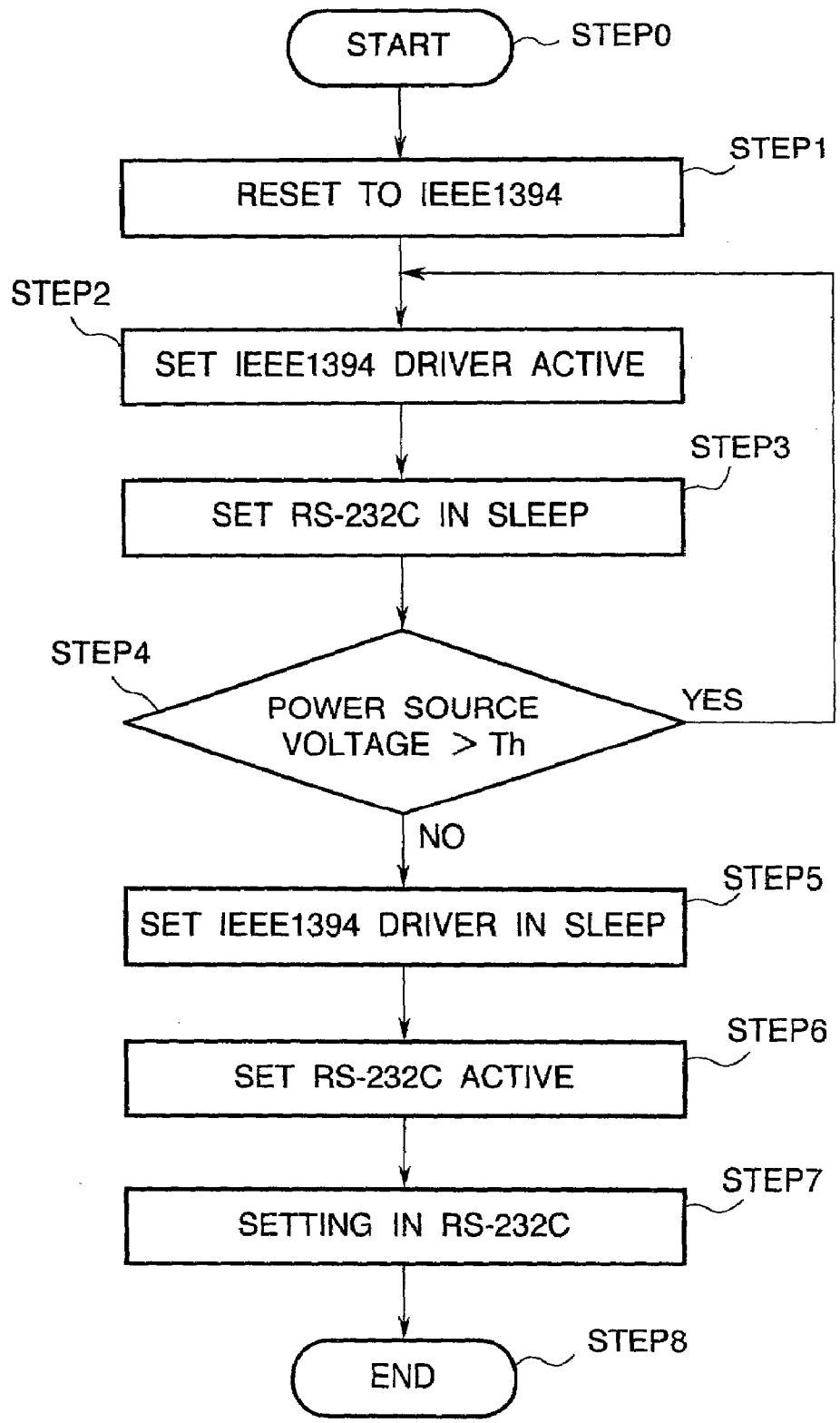
FIG. 8 is a flow chart showing the flow of digital I/F switching control according to the present invention.

FIG. 8 is a flow chart showing the flow of interface switching control. Referring to FIG. 8, the control is started from step 0. In step 1, the communication mode is reset to the 1394 mode. In step 2, the 1394 driver 31 is set active. In step 3, the RS-232C driver 33 is set in sleep.

In step 4, the level of the power supply voltage of the power supply twisted pair line of the 1394 twisted pair lines is compared with a threshold voltage Th previously determined in the system to check whether the power supply voltage is higher than the threshold voltage Th. This threshold voltage Th is set to, e.g., 4 V.

If the power supply voltage of the power supply twisted pair line of the 1394 twisted pair lines is higher than the threshold voltage Th, the flow returns to step 2. If this is the case, the processes in steps 2 to 4 form a loop to hold the 1394 driver 31 active and the RS-232C driver 33 in sleep.

On the other hand, if it is determined in step 4 that the power supply voltage of the power supply twisted pair line of the 1394 twisted pair lines is lower than the threshold voltage Th, the flow advances to step 5. In step 5, the 1394 driver 31 is set in sleep. In step 6, the RS-232C driver 33 is set active. In step 7, the communication mode is set in the RS-232C mode. In final step 8, the control is completed.

Although not shown in the flow chart of FIG. 8, in this embodiment the power supply voltage of the power supply twisted pair line of the 1394 twisted pair lines is measured at fixed time intervals. If this measured power supply voltage is higher than the threshold voltage Th previously set in the system, the control start routine in step 0 is started. Therefore, even after the communication mode is set in the RS-232C mode, if the 1394 driver 31 is again connected to the 1394 serial bus, the communication mode is automatically switched to the 1394 mode.

In this embodiment as described above, it is unnecessary to provide a plurality of communication apparatuses for various communication systems in one digital device. Therefore, a digital device corresponding to two communication systems of the 1394 and RS-232C can be manufactured without increasing the circuit scale.

In this embodiment, data communication is performed in the 1394 communication mode when the 1394 driver 31 is connected to the 1394 serial bus. When the 1394 serial bus is disconnected, the RS-232C driver 33 is automatically activated to perform data communication in the RS-232C communication mode. Therefore, even when a plurality of devices are connected to both the 1394 serial bus and the RS-232C data channel, no connection setting operation need be performed, and high operability can be realized.

Although the above embodiment is described by using the IEEE1394 standard and the RS-232C standard, another standard (e.g., the RS-422 standard) can also be used in place of the RS-232C standard. Alternatively, a communication line of any other standard than the IEEE1394 standard can be used, provided that the channel has a function of supplying power.

Figure 9:
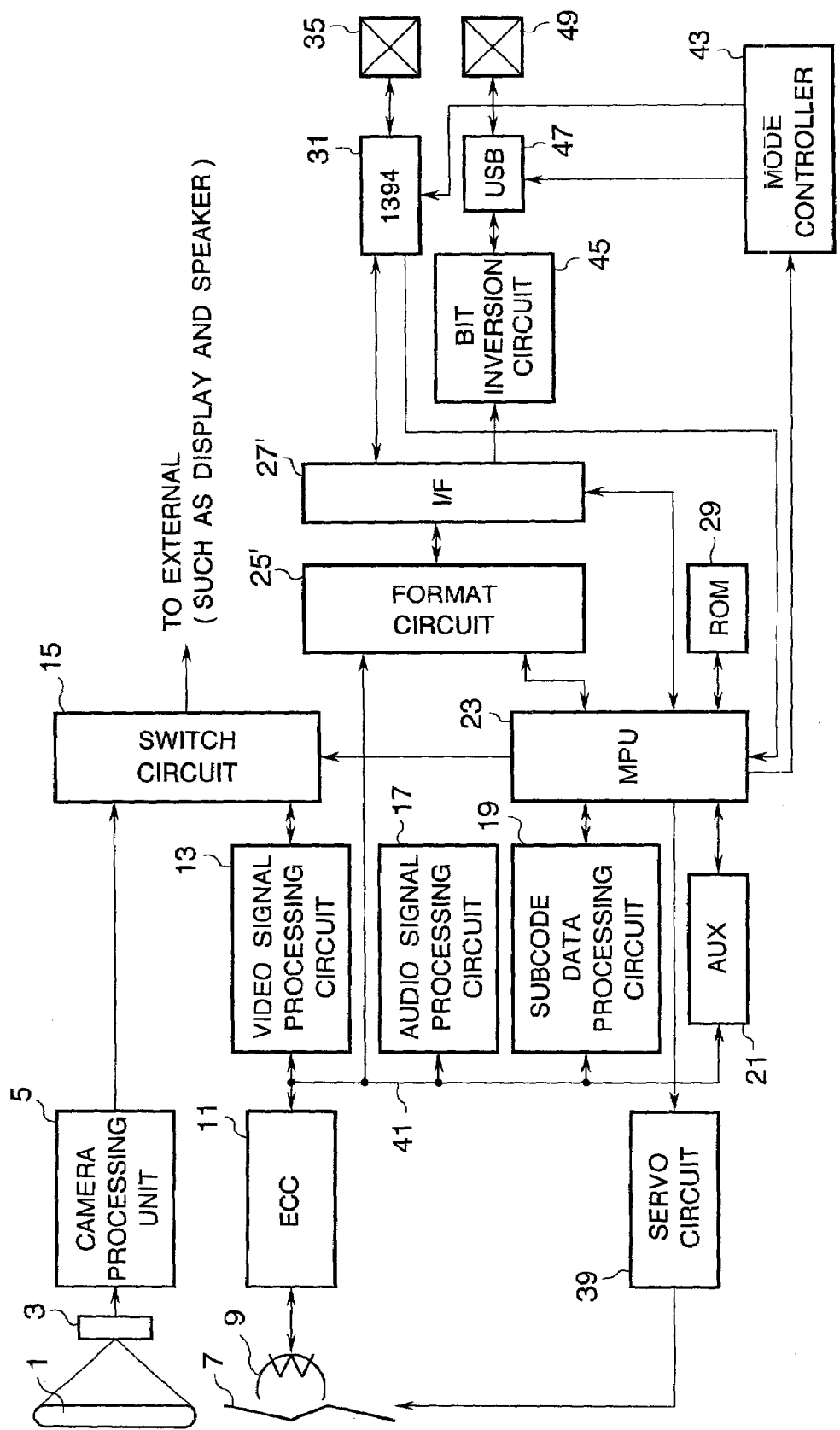
FIG. 9 is a block diagram showing the arrangement of a video camera of the second embodiment according to the present invention.

The second embodiment according to the present invention will be described below with reference to the accompanying drawings. FIG. 9 is a block diagram showing the embodiment in which the present invention is applied to a video camera, i.e., a so-called SD (Standard Definition) camera, for recording and reproducing an SD video signal. The second embodiment differs from the first embodiment in that the first embodiment includes the IEEE1394 and RS-232C as digital interfaces, but the second embodiment includes the IEEE1394 and the USB. That is, this embodiment discloses an apparatus in which at least some of command data or of a plurality of device control data generated on the basis of the received command data are used in communication systems of both the 1394 and the USB. The same reference numerals as in FIG. 6 denote the same parts in FIG. 9, and a detailed description thereof will be omitted.

Referring to FIG. 9, this apparatus comprises a bit inversion circuit 45, a USB driver 47, and a USB I/O port 49.

Video and audio DIF data are directly input from a data bus 41 to a format circuit 25'. The format circuit 25' also receives subcode data and AUX data from an MPU 23, converts the data into DIF data, and outputs the DIF data. This DIF data is packeted by an I/F circuit 27'.

The format circuit 25' and the I/F circuit 27' are so controlled as to perform processing suited to one of the 1394 interface and the USB interface selected by the MPU 23.

When the 1394 interface is to be used, data is supplied to a 1394 I/O port 35 via a 1394 driver 31. When the USB interface is to be used, data is supplied to the bit inversion circuit 45, the USB driver 47, and the USB I/O port 49.

The 1394 and the USB transmit data by using different bit output methods; i.e., the most significant bit is transmitted first (MSB first) in the 1394, and the least significant bit is output first (LSB first) in the USB. When the USB is used, therefore, the bit inversion circuit 45 performs bit inversion for data to be transmitted and received. In this embodiment, bit inversion is performed for data to be transmitted and received by the USB on the basis of the 1394. However, bit inversion can also be performed for data to be transmitted and received by the 1394 on the basis of the USB.

The 1394 interface and the USB interface can be switched by the user by using an external select switch or can also be automatically switched by detecting the connections of these interfaces.

The automatic interface switching will be described later.

As shown in the first embodiment, a code such as "0x0021C336" is input from an external device when the user intends to cause a VCR to perform normal reproduction.

When this normal reproduction code is input from the 1394 I/O port 35, on the basis of the input code the I/F circuit 27' generates an address in a ROM 29 storing data for normal reproduction and applies the address to the MPU 23. In accordance with this address data, the MPU 23 reads out the control data from the ROM 29 and controls a rotary drum and a capstan motor (neither is shown) via a servo circuit 39, thereby holding the reproduction state.

Figure 10A:
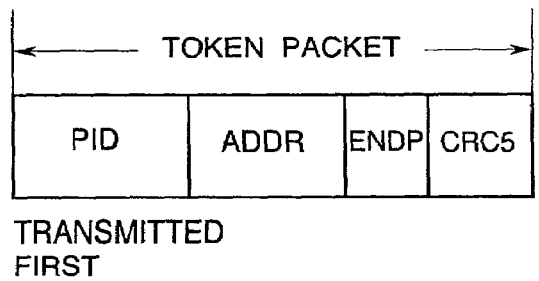
FIGS. 10A and 10B are views showing data formats transmitted from a host in bulk transfer.
Figure 10B:
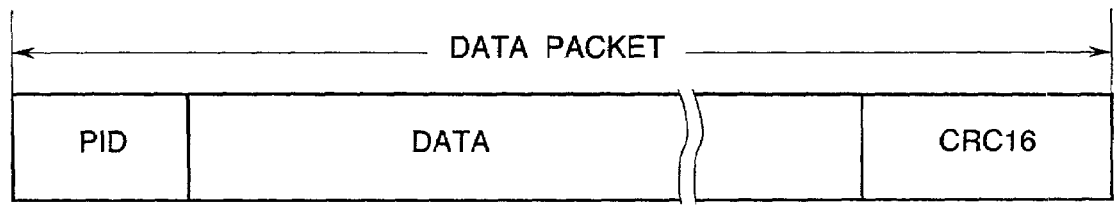

On the other hand, when the user intends to perform normal reproduction in the same manner as above by using the USB, a code is transmitted from a host (not shown) by the bulk transfer described earlier. In the bulk transfer, a token packet as shown in FIG. 10A is transmitted in the start frame of the bulk transfer. In the next frame, the host transmits a data packet as shown in FIG. 10B. A code such as 0x0021C336 described above is contained in a data field of this data packet. Transmission of such comparatively small data is complete by two frames because data up to 1,023 bytes can be contained in the data field.

TABLE 6

PIDs of token packet

| PID name | PID value |
|---|---|
| OUT | $11100001_2$ |
| IN | $01101001_2$ |
| SETUP | $00101101_2$ |

TABLE 7

PIDs of data packet

| PID name | PID value |
|---|---|
| DATA0 | $11000011_2$ |
| DATA1 | $01001011_2$ |

The PIDs in the token packet will be described below. The first PID is OUT indicating that data transfer from the host is started, the second PID is IN indicating that data transfer to the host is started, and the third PID is SETUP indicating that device setup is started. Table 6 above shows the values of these PIDs. Note that all token packets are issued by the host.

A data packet has two kinds of PIDs. If the data packet is not complete in one frame, the first frame is started from DATA0, and PIDs are toggled like DATA0/DATA1/

DATA0/ . . . in units of frames. Table 7 above shows the values of these PIDs. In this embodiment, only one frame of the data packet is transmitted. Therefore, only DATA0 is used as the PID value.

As described above, the USB and the 1394 have different bit output methods. In the USB, therefore, a code such as 0x0021C336 in the 1394 described above arrives at the USB driver 47 in the form of a code such as 0x0084C3CA formed by performing bit inversion in units of bytes. Accordingly, the bit inversion circuit: 45 converts a code having the value 0x0084C3CA into a code having the value 0x0021C336 by performing bit inversion in units of bytes, and outputs the converted code. In this embodiment, the bit inversion circuit 45 is provided separately from the USB driver 47. However, the USB driver 47 can also have this function.

Figure 11:
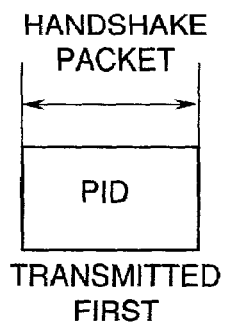
FIG. 11 is a view showing ACK returned from an SD video camera of this embodiment in bulk transfer.

When the transmission from the host is complete, the SD video camera of this embodiment informs the host of the completion of the transmission by using a handshake packet as shown in FIG. 11. This handshake packet is constituted only by PID and changes the meaning of information in accordance with the value of the PID. Table 8 below shows the values of the PID. ACK indicates that the communication is normally complete. NACK indicates that the data from the host has an error. If this is the case, the host repeats the same data transfer as above. STALL indicates that the SD video camera of this embodiment is made unable to perform data transmission/reception for some reason.

TABLE 8

PIDs of handshake packet

| PID name | PID value |
| --- | --- |
| ACK | $11010010_2$ |
| NACK | $01011010_2$ |
| STALL | $00011110_2$ |

When informed by ACK that the communication is normally completed, the host again transmits the token packet to the SD video camera of this embodiment in order to receive a response code. In the next frame, the SD video camera of this embodiment inserts, e.g., a response code 0x0921C336, indicating that normal reproduction is possible, into a data packet and transmits the data packet. When normally receiving the data packet, the host transmits the ACK handshake packet to the SD video camera of this embodiment to complete one transmission/reception.

In this embodiment, the control code and the response code are exchanged by using only bulk transfer. However, USB interrupt transfer can also be used in transmitting the response code. This configuration has the advantage that the response code can be reliably returned even if the data amount on the communication line is increased, since interrupt transfer has a higher transfer priority order than that of bulk transfer. Also, isochronous transfer can be used instead of bulk transfer in exchanging the control code and the response code.

Figure 12:
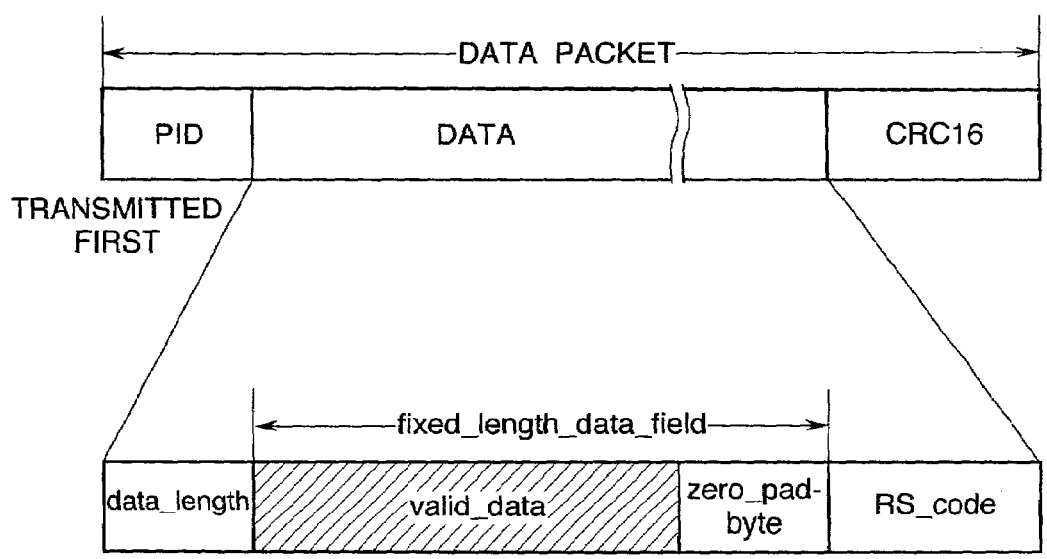
FIG. 12 is a view showing the arrangement of a data packet in this embodiment.

USB communication can also be performed by adding additional information to a data packet for performing the communication. FIG. 12 shows a whole data packet when the additional information is added, and the arrangement of a data field in the data packet. This data packet is transmitted by, e.g., isochronous transfer. During the transmission, the data field of the data packet is transmitted by a fixed length from the start to the end of the communication.

In the data field shown in FIG. 12, a field to be transmitted first is a data_length field. The data length of the data_length field is set to, e.g., 1 byte. This field indicates an effective data length contained in the data field in units of bytes. A fixed_length_data_field follows the data_length field. This field is a fixed-length data field as described above. This field includes a valid_data field containing effective data to be actually decoded and a zero_pad_byte field in which data whose value is 0 is packed. If the data length of the valid_data field equals the data length of the fixed_length__data_field, the zero_pad_byte field does not exist in the fixed length data field. The value of the zero_pad_byte field is not limited to zero, and some other data such as 0xFF can also be used. The data length of the fixed_length_data_field is set to, e.g., 15 bytes.

In the data field shown in FIG. 12, an RS code field to be transmitted last is an error detecting-correcting code such as a Reed-Solomon code. Although a Reed-Solomon code is used in this embodiment, another error detecting-correcting code such as a Humming code can also be used. In this embodiment, a Reed-Solomon code having, e.g., 8 bytes is added.

Figure 13:
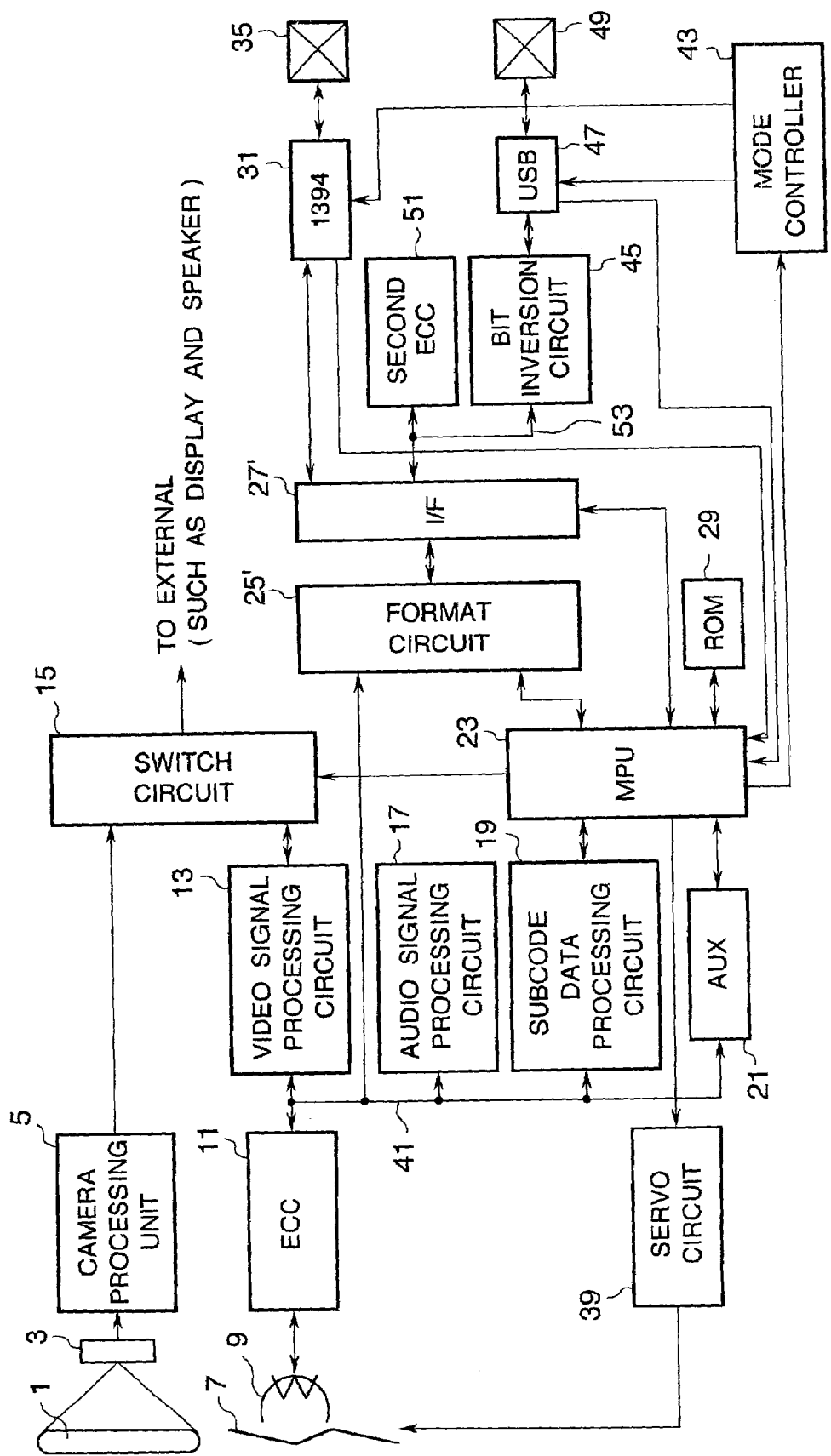
FIG. 13 is a block diagram showing the arrangement of a digital video camera using the data packet shown in FIG. 12.

FIG. 13 is a block diagram in which a communication apparatus using the data packet shown in FIG. 12 is applied to an SD video camera. The same reference numerals as in FIG. 9 denote the same parts in FIG. 13, and a detailed description thereof will be omitted. Referring to FIG. 13, this SD video camera comprises a second error correcting circuit (ECC) 51 and a second data bus 53.

When normal reproduction is to be performed, a code in which the value of the valid_data field in the data field shown in FIG. 12 is 0x0021C336 is applied from an external device to the USB driver 47 via the USB I/O port 49. Since the effective data length is set to four bytes, the value of the data_length field is 0x04. In fact, the value of the above data is bit-inverted in units of bytes. The bit inversion circuit 45 converts this bit-inverted value into a normal value. Each converted data is supplied to the second error correcting circuit 51 through the second data bus 53, and errors occurring on the communication line are detected and corrected. In this embodiment, 4-byte correction is possible.

With the above arrangement, even in isochronous transfer in which a retransmission request cannot be made by NACK, the accuracy of data in communication can be increased. Also, the use of isochronous transfer having a comparatively high priority order has the advantage that the response can be rapidly performed in exchanging data. Note that the data format described above can contain not only the data length and the error detecting correcting code but also some other additional information. Note also that the numbers of bytes of the data_length field, the fixed_length__data_field, and the RS_code field are not limited to those of the above arrangement, so another arrangement can naturally be used. Furthermore, although isochronous transfer is used in this embodiment, the above arrangement is applicable to another transfer system such as bulk transfer.

The automatic interface switching will be described next. As described in the first embodiment, the 1394 driver 31 monitors the connection of the 1394 by detecting the power supply voltage of a power supply twisted pair line of 1394 twisted pair lines, and outputs the connection state to the MPU 23. The USB driver 47 also monitors the connection of the USB from the signal statuses of USB twisted pair lines and outputs the connection state to the MPU 23.

First, connection switching when the 1394 driver 31 is the master will be described. In this case, 1394 connection is performed as much as possible. The 1394 driver 31 applies a control signal from the 1394 bus and the 1394 connection state data described earlier to the MPU 23. While the 1394 driver 31 is applying to the MPU 23 the data indicating that the 1394 bus is connected, the MPU 23 holds the 1394 driver 31 active in order to set the communication mode in the 1394 mode. Also, upon receiving this 1394 setting signal, the MPU 23 holds the USB driver 47 in sleep.

When the 1394 driver 31 is disconnected from the 1394 bus, the power supply voltage of the power supply twisted pair line of the 1394 twisted pair lines drops, The 1394 driver 31 detects this voltage drop and outputs to the MPU 23 data indicating that the 1394 driver 31 is disconnected from the 1394 bus. When receiving this data, the MPU 23 sets the 1394 driver 31 in sleep and the USB driver 47 active.

Next, connection switching when the USB driver 47 is the master will be described. In this case, USB connection is performed as much as possible. The USB driver 47 applies a control signal from the USB bus and the USB connection state data described previously to the MPU 23. The USB bus signal operates as differential signals. The differential signals are D+ and D−. When the USB driver 47 is connected to the USB bus, one of the D+ and D− holds a voltage higher than a maximum value $V_{SE}(MAX)$ of a single-end threshold, and the other has a voltage lower than $V_{SE}(MAX)$. The USB driver 47 detects this state and applies data indicating USB bus connection to the MPU 23. While the USB driver 47 is inputting, to the MPU 23, the data indicating that the USB bus is connected, the MPU 23 holds the USB driver 47 active in order to set the communication mode in the USB mode. Also, upon receiving this USB setting signal, the MPU 23 holds the 1394 driver 31 in sleep.

When the USB driver 47 is disconnected from the USB bus, the voltages of both D+ and D− become lower than the voltage $V_{SE}(MAX)$. If this state continues for 2.5 μsec or longer, the USB driver 47 determines that the connection is cut. The USB driver 47 outputs, to the MPU 23, data indicating that the USB driver 47 is disconnected from the USB bus. Upon receiving this data, the MPU 23 sets the communication mode in the 1394 mode. Also, the MPU 23 sets the USB driver 47 in sleep and the 1394 driver 31 active.

The switching performed to set the 1394 or the USB as the master can also be performed by the user by using a switch (not shown) or the like. Also, the 1394 can be set as the master by a standard operation, and this can be reset when the power supply is turned on. Alternatively, the USB can be set as the master by a standard operation, and this can be reset when the power supply is turned on. Any arbitrary setting can be performed as long as the apparatus operates as above.

The above embodiments have been described by using two digital I/Fs. However, the present invention similarly applicable to an apparatus including three or more digital I/Fs such as the IEEE1394, the USB, and RS-232C.

In other words, the foregoing description of embodiments has been given for illustrative purposes only and not to be constructed as imposing any limitation in every respect.

The scope of the invention is, therefore, to be determined solely by the following claims and not limited by the text of the specifications and alterations made within the scope equivalent to the scope of the claims fall within the true spirit and scope of the invention.

What is claimed is:

1. A communication apparatus comprising:
   a) first communication means conformed to a first communication standard;
   b) second communication means conformed to a second communication standard different from the first communication standard; and
   c) a control unit coupled to said first and second communication means,
   wherein said first communication means is capable of detecting whether or not another apparatus is disconnected from said first communication means,
   wherein said control unit is capable of setting said second communication means in an active state, if said first communication means detects that another apparatus is disconnected from said first communication means when said second communication means is in an inactive state, and
   wherein said second communication means is capable of being used to communicate with another apparatus when said second communication means is set in the active state, and is not capable of being used to communicate with another apparatus when said second communication means is set in the inactive state.

2. An apparatus according to claim 1, wherein the first communication standard is an IEEE 1394 standard.

3. An apparatus according to claim 1, further comprising a video signal processing unit coupled to said first and second communication means, and adapted to process a video signal being provided to said first or second communication means.

4. An apparatus according to claim 1, wherein the second communication standard is one of a RS-232C standard, a RS-422 standard, and a USB standard.

5. An apparatus according to claim 2, wherein the second communication standard is one of a RS-232C standard, a RS-422 standard, and a USB standard.

6. An apparatus according to claim 5, further comprising a video signal processing unit coupled to the said first and second communication means, and adapted to process a video signal being provided to said first or second communication means.

7. A method of controlling a communication apparatus that includes first communication means conformed to a first communication standard, and second communication means conformed to a second communication standard different from the first communication standard, said method comprising the steps of:
   detecting using the first communication means whether or not another apparatus is disconnected from the first communication means; and
   setting the second communication means in an active state, if the first communication means detects that another apparatus is disconnected from the first communication means when the second communication means is in an inactive state,
   wherein the second communication means is capable of being used to communicate with another apparatus when the second communication means is set in the active state, and is not capable of being used to communicate with another apparatus when the second communication means is set in the inactive state.

8. An apparatus according to claim 1, wherein said control unit is capable of setting said second communication means in the inactive state, if said first communication means detects that another apparatus is connected to said first communication means when said second communication means is in the active state.

9. An apparatus according to claim 8, wherein the first communication standard is an IEEE 1394 standard, and wherein the second communication standard is one of a RS-232C standard, a RS-422 standard, and a USB standard.

10. A method according to claim 7, wherein the first communication standard is an IEEE 1394 standard.

11. A method according to claim 7, wherein the communication apparatus includes a video signal processing unit coupled to the first and second communication means, and adapted to process a video signal being provided to the first and second communication means.

12. A method according to claim 7, wherein the second communication standard is one of a RS-232C standard, a RS-422 standard, and a USB standard.

13. A method according to claim 10, wherein the second communication standard is one of a RS-232C standard, a RS-422 standard, and a USB standard.

14. A method according to claim 7, further comprising the step of:
setting the second communication means in the inactive state, if the first communication means detects that another apparatus is connected to the first communication means when the second communication means is in the active state.

15. A method according to claim 14, wherein the first communication standard is an IEEE 1394 standard, and wherein the second communication standard is one of a RS-232C standard, a RS-422 standard, and a USB standard.

16. An apparatus according to claim 9, further comprising a video signal processing unit coupled to the said first and second communication means, and adapted to process a video signal being provided to said first or second communication means.

17. A method according to claim 13, wherein the communication apparatus includes a video signal processing unit coupled to the first and second communication means, and adapted to process a video signal being provided to the first or second communication means.

18. A method according to claim 15, wherein the communication apparatus includes a video signal processing unit coupled to the first and second communication means, and adapted to process a video signal being provided to the first or second communication means.

* * * * *

UNITED STATES PATENT AND TRADEMARK OFFICE
CERTIFICATE OF CORRECTION

PATENT NO. : 6,996,096 B2 Page 1 of 1
APPLICATION NO. : 09/022979
DATED : February 7, 2006
INVENTOR(S) : Mitsuo Niida et al.

It is certified that error appears in the above-identified patent and that said Letters Patent is hereby corrected as shown below:

ON THE TITLE PAGE
At Item (56), Other Publications, at "Issei Kino," "COnference" should read --Conference--.

COLUMN 5
Line 35, "a of" should read --a method of--.

COLUMN 6
Line 2, "off" should read --of--.

COLUMN 9
Line 29, "extended header" should read --extended header address.--.

COLUMN 15
Line 10, "circuit:" should read --circuit--.

COLUMN 17
Line 8, "drops," should read --drops.--.

COLUMN 18
Line 32, "the said" should read --said--.

COLUMN 20
Line 4, " the said" should read --said--.

Signed and Sealed this

Twelfth Day of September, 2006

JON W. DUDAS
*Director of the United States Patent and Trademark Office*